Patented May 5, 1925.

1,536,881

UNITED STATES PATENT OFFICE.

CARLETON ELLIS, OF MONTCLAIR, NEW JERSEY.

HEAT REACTIVE PLASTIC.

No Drawing.   Application filed June 14, 1922. Serial No. 568,251.

*To all whom it may concern:*

Be it known that I, CARLETON ELLIS, a citizen of the United States, and a resident of Montclair, in the county of Essex and State of New Jersey, have invented certain new and useful Improvements in Heat Reactive Plastics, of which the following is a specification.

This invention relates to synthetic plastic materials and molding compounds made therefrom and to the process of making such products, the basis of which being methylol urea or its appropriate derivatives. These may be used alone or preferably with various natural or synthetic resins or resin-forming substances, with or without fillers or extending and coloring agents.

Either the monomethylol urea or the dimethylol urea may be used singly or in admixture or their appropriate derivatives may be utilized, e. g., substituted ureas acting in a similar or equivalent manner. The term urea is employed here to embrace carbamide and appropriate derivatives.

In the present invention dimethylol urea or mixtures of this substance with some monomethylol urea are preferred. When dimethylol urea is heated it melts somewhere in the neighborhood of 120° C. but on further heating for example 20 or 30 degrees higher reaction takes place and a susbtance is formed which is quite infusible at the temperature at which it is produced and may be heated to a considerably higher temperature before softening or carbonization occurs. For example it may be heated nearly 100 degrees above its hardening point before it begins to show signs of decomposition. This property of heat-setting or becoming thermo-rigid makes possible the use of the material in or as a basis of molding compounds which under heat and pressure become solidified or consolidated to a shaped mass. Thus molded articles may be obtained which are firm, strong and more or less heat resistant.

In the molding field there is desired not necessarily a perfectly infusible resin or binder but one which on solidifying at the molding temperature is sufficiently firm at that temperature to be removed from the molding press while still hot and be handled and exposed without deformation or loss of surface lustre. The labor cost in molding is so great that the few minutes time required to cool the mold in the production of plastics from fusible resins which do not harden or become thermo-rigid represents a considerable item in the total cost of manufacture. Hence the desirability of a resin not necessarily infusible but which will sufficiently harden in the mold at the molding temperature.

Dimethylol urea is suitable for this purpose on account of its hardening property, the differential or spread in temperature between the melting point and the point at which it decomposes under strong heating is sufficiently great that even though not wholly infusible it is capable of meeting the demand for a labor-saving molding compound of this general character.

It is not necessary to employ pure dimethylol urea but the crude substance, contaminated with various other bodies, may be used in many cases. It is however desirable to heat the crude dimethylol urea for a period to thoroughly dry it and remove as far as possible any substances which might evolve gases in the mold. Thus dimethylol urea was baked 18 hours at 120° C. A white product was obtained which was placed in a mold in powdered form and molded at 300° F. under a pressure of 1000 pounds and higher. A white solid article was obtained which had a glossy surface and which when placed in a Bunsen flame did not melt but burned slowly with carbonization.

Desirable combinations may be made with various synthetic resins as for example by incorporation with a fusible phenol formaldehyde resin. Such a mixture on heating in the mold yields a heat-resisting urea compound. A product of this character will set sufficiently in hot pressing to be useful in molding operations. The reaction is a complex one, the urea compound probably forming the substance $C_5H_{10}N_4O_3$ in part and also probably reacting with the phenol formaldehyde product to a certain extent. In place of phenol, cresol, naphthol and other reactive bodies are not excluded. Acetaldehyde also may be used with, or in substitution for, formaldehyde.

An example is the following. 210 parts by weight of phenol and 150 parts of aqueous formaldehyde were placed in an autoclave and heated for 2 hours raising the pressure as quickly as possible to 100 pounds and maintaining this pressure during the reaction. This called for a temperature of 138 to 143° C. After the reaction was complete the water which had separated from the resinous mass that had formed was removed. The dry resin was fusible and was completely soluble in alcohol. 1 part by weight of well dried dimethylol urea was incorporated with 10 parts by weight of this phenol formaldehyde resin and on heating was found to set to a product of substantially higher melting point than the original mix.

On adding larger proportions of the dimethylol urea up to approximately an equal weight of the fusible phenol formaldehyde resin various modified complex substances could be obtained on hot pressing at temperatures between 125 and 150° C. These products ranged from ones which on hot pressing increased in melting point only slightly to complexes which had a very decided increment in melting point.

Another type of molding composition is made from a binder comprising dimethylol urea and a resin obtained by reacting with furfural on phenol. For example furfural is mixed with several times its volume of phenol or cresol, an excess of the phenolic body being used and this is treated with a small amount of hydrochloric acid. The latter may be aqueous hydrochloric acid or preferably alcohol saturated with the gas. Hydrochloric acid reacts on furfural very violently and the tendency is to form a black rubbery-like substance which is insoluble and infusible and without any useful properties in that condition. When only a small amount of phenol is present such as would be required solely for the reaction with furfural the tendency also is to produce the infusible rubbery substance. An excess of phenol however which may be removed at the close of the reaction by steam distillation or in any other suitable manner permits of the formation of a fusible furfural resin which is then capable of being incorporated with fillers or extending agents. The amount of hydrochloric acid used need not be large preferably when kept down to a few per cent there is less danger of forming an infusible product. The reaction may be allowed to take place advantageously at about 80° C. A fusible resin having been obtained in this manner may be incorporated with dimethylol urea in various proportions. Thus a major proportion of the furfural resin may be used in some cases while in others it is desirable to use an excess of the dimethylol urea. As the plastic substance obtained is darkened by the furfural resin the composition is best adapted for use in making brown or black molding compounds.

It may be added that furfural resin made as above with an excess of phenol may also be incorporated with other substances as for example paraform or hexamethylenetetramine. Such compositions have the property of hardening when heated and they may if desired be incorporated with dimethylol urea in any proportions desired.

A suitable composition is made from fusible furfural phenol resin and dimethylol urea in the proportions of 3 parts of the former to 1 part of the latter. In this case no hexamethylenetetramine or formaldehyde derivative of such a character is introduced.

2 parts of the furfural phenol resin to 1 part of dimethylol urea may likewise be intimately mixed and if desired 10 per cent of hexamethylenetetramine may be added. Preferably however as indicated no hexamethylenetetramine or similar substance is employed.

It is a distinct advantage in the recovery of the molding material to have a resin or binder which does not become entirely infusible. In molding there is a considerable amount of wastage and if this waste material is infusible it cannot be used again to advantage. On the other hand if still fusible even though at a higher temperature than that used in molding it is possible to utilize it by suitably fluxing it. A resinous composition which is capable of recovery in this manner therefore forms a part of the present invention.

Another composition is that made by reacting on furfural with aniline hydrochloride. For example 1 part of aniline hydrochloride is dissolved in 2½ parts of furfural and is very gently heated and incorporated with dimethylol urea. Care should be taken to avoid any increase of the temperature which forms an infusible compound prematurely.

Another composition is that involving a mixture of dimethylol urea and monomethylol urea incorporated in various proportions as for example equal parts by weight. While this material may be used by itself for molding purposes it may also be admixed with the fusible phenol formaldehyde resin for example as above described or with a furfural phenol resin or a furfural aniline resin. The proportions used being for example equal parts or compositions containing more of one constituent than the other.

Dimethylol urea also may be incorporated with phenol sulphur resins made by reacting on phenol with sulphur chloride. For example 1 part by weight of phenol is treated with 2 to 2¼ parts of sulphur monochloride to yield a resin as described in my prior application pending.

This resin may be incorporated with 10 per cent and upwards of dimethylol urea.

Dimethylol urea also may be incorporated with a resin obtained by reacting on acetone or other ketone with formaldehyde as described in my prior applications pending.

Dimethylol urea may be incorporated with natural resins such as shellac and copal resin. Thus cracked congo resin as "run" by heat treatment in the manufacture of varnishes may be utilized. Also bodies of the nature of asphaltum or gilsonite may be used.

Various fillers or extending agents may be employed for example mineral fillers gypsum, whiting, mica, infusorial earth, clay and asbestos or organic fillers such as cotton flock, wood pulp, saw dust, wood flour, cork, leather scrap, etc.

Molding compounds may be made by mixing such fillers as for example equal parts of filler and binder to form molding powders. The filler may be simply ground with the binder or may be impregnated by means of a solution. Or the materials may be incorporated and worked out into sheeted form. This may be accomplished by mixing on differential rolls and then running through sheeting rolls.

Paper or cloth may be impregnated and sheets pressed together to form blocks. The binding agent in the form of a solution may be used as a lacquer or incorporated with filler may be employed as a cement.

Shaped articles made under heat and pressure in accordance with the foregoing may be defined or characterized by containing a heat-set urea derivative.

What I claim is:—

1. A molding composition containing dimethylol urea and a phenol formaldehyde fusible resin.

2. A shaped article containing a heat-set methylol urea derivative.

3. A shaped article containing a heat-set dimethylol urea derivative.

4. The process of making a binding agent adapted for use in making molding compounds which comprises incorporating dimethylol urea with a synthetic resin.

5. A shaped article containing a heat-set methylol urea derivative incorporated with a synthetic resin.

6. A molding composition containing dimethylol urea.

7. A molding composition containing thoroughly dried dimethylol urea.

8. A molding composition containing a mixture of mono and dimethylol urea.

9. A product obtained by heating a methylol urea at or above its melting point until it becomes infusible at the temperature of heating.

10. A product obtained by heating dimethylol urea at or above its melting point until it becomes infusible at the temperature of heating.

11. A molding composition containing a heat treated methylol urea.

12. A molding composition containing a heat treated dimethylol urea.

13. A molding composition containing a heat treated dimethylol urea in powdered form.

14. A molding composition containing methylol urea and a phenolic resin.

15. A molding composition containing methylol urea and an aldehydic resin.

16. A molding composition containing methylol urea and a phenol aldehyde fusible resin.

17. A resinous composition adapted for molding containing a methylol urea resin which does not become infusible upon molding.

18. A molded methylol urea derivative.

CARLETON ELLIS.

Dimethylol urea may be incorporated with natural resins such as shellac and copal resin. Thus cracked congo resin as "run" by heat treatment in the manufacture of varnishes may be utilized. Also bodies of the nature of asphaltum or gilsonite may be used.

Various fillers or extending agents may be employed for example mineral fillers gypsum, whiting, mica, infusorial earth, clay and asbestos or organic fillers such as cotton flock, wood pulp, saw dust, wood flour, cork, leather scrap, etc.

Molding compounds may be made by mixing such fillers as for example equal parts of filler and binder to form molding powders. The filler may be simply ground with the binder or may be impregnated by means of a solution. Or the materials may be incorporated and worked out into sheeted form. This may be accomplished by mixing on differential rolls and then running through sheeting rolls.

Paper or cloth may be impregnated and sheets pressed together to form blocks. The binding agent in the form of a solution may be used as a lacquer or incorporated with filler may be employed as a cement.

Shaped articles made under heat and pressure in accordance with the foregoing may be defined or characterized by containing a heat-set urea derivative.

What I claim is:—

1. A molding composition containing dimethylol urea and a phenol formaldehyde fusible resin.
2. A shaped article containing a heat-set methylol urea derivative.
3. A shaped article containing a heat-set dimethylol urea derivative.
4. The process of making a binding agent adapted for use in making molding compounds which comprises incorporating dimethylol urea with a synthetic resin.
5. A shaped article containing a heat-set methylol urea derivative incorporated with a synthetic resin.
6. A molding composition containing dimethylol urea.
7. A molding composition containing thoroughly dried dimethylol urea.
8. A molding composition containing a mixture of mono and dimethylol urea.
9. A product obtained by heating a methylol urea at or above its melting point until it becomes infusible at the temperature of heating.
10. A product obtained by heating dimethylol urea at or above its melting point until it becomes infusible at the temperature of heating.
11. A molding composition containing a heat treated methylol urea.
12. A molding composition containing a heat treated dimethylol urea.
13. A molding composition containing a heat treated dimethylol urea in powdered form.
14. A molding composition containing methylol urea and a phenolic resin.
15. A molding composition containing methylol urea and an aldehydic resin.
16. A molding composition containing methylol urea and a phenol aldehyde fusible resin.
17. A resinous composition adapted for molding containing a methylol urea resin which does not become infusible upon molding.
18. A molded methylol urea derivative.

CARLETON ELLIS.

DISCLAIMER 1,536,881.—*Carleton Ellis*, Montclair, N. J. HEAT REACTIVE PLASTIC. Patent dated May 5, 1925. Disclaimer filed March 16, 1932, by the assignee, *Ellis-Foster Company*.

Hereby disclaims the article or product set forth in claims 2, 3, 9, 10, and 18, except when such article or product has been molded under heat and pressure from a molding composition that is substantially dry.

[*Official Gazette April 12, 1932.*]

DISCLAIMER 1,536,881.—*Carleton Ellis*, Montclair, N. J. HEAT REACTIVE PLASTIC. Patent dated May 5, 1925. Disclaimer filed March 16, 1932, by the assignee, *Ellis-Foster Company*.

Hereby disclaims the article or product set forth in claims 2, 3, 9, 10, and 18, except when such article or product has been molded under heat and pressure from a molding composition that is substantially dry.

[*Official Gazette April 12, 1932.*]